United States Patent [19]

Schilling

[11] Patent Number: 5,093,840
[45] Date of Patent: Mar. 3, 1992

[54] ADAPTIVE POWER CONTROL FOR A SPREAD SPECTRUM TRANSMITTER

[75] Inventor: Donald L. Schilling, Sands Point, N.Y.

[73] Assignee: SCS Mobilecom, Inc., Port Washington, N.Y.

[21] Appl. No.: 614,816

[22] Filed: Nov. 16, 1990

[51] Int. Cl.⁵ ............................................... H04K 1/00
[52] U.S. Cl. .......................................... 375/1; 455/33; 379/59; 380/34
[58] Field of Search ...................... 375/1, 102; 380/33, 380/34, 39, 40; 455/33, 59, 61, 103, 191, 212, 213, 224, 225; 379/59, 63

[56] References Cited

U.S. PATENT DOCUMENTS

| | | | |
|---|---|---|---|
| 3,838,342 | 9/1974 | Bjorkman | 375/1 |
| 4,189,677 | 2/1980 | Cooper | 375/1 X |
| 4,285,060 | 8/1981 | Cobb et al. | 375/1 X |
| 4,538,280 | 8/1985 | Mosler, Jr. et al. | 375/1 |
| 4,958,359 | 9/1990 | Kato | 375/1 |

Primary Examiner—Thomas H. Tarcza
Assistant Examiner—Tod Swann
Attorney, Agent, or Firm—David B. Newman, Jr. & Associates

[57] ABSTRACT

An apparatus for adaptive-power control of a spread-spectrum transmitter of a mobile station operating in a cellular-communications network using spread-spectrum modulation. A base station transmits a generic spread-spectrum signal and an APC-data signal. A mobile station has an acquisition circuit for acquiring and decoding the generic spread-spectrum signal, a detector for detecting a received power level of the generic spread-spectrum signal, a decoder for decoding the APC-data signal as a threshold, a differential amplifier for generating a comparison signal by comparing the received power level to the threshold, a transmitter for transmitting a transmitter spread-spectrum signal, an antenna, and a variable-gain device responsive to the comparison signal indicating an increase or decrease for adjusting a transmitter-power level of the transmitter spread-spectrum signal.

8 Claims, 3 Drawing Sheets

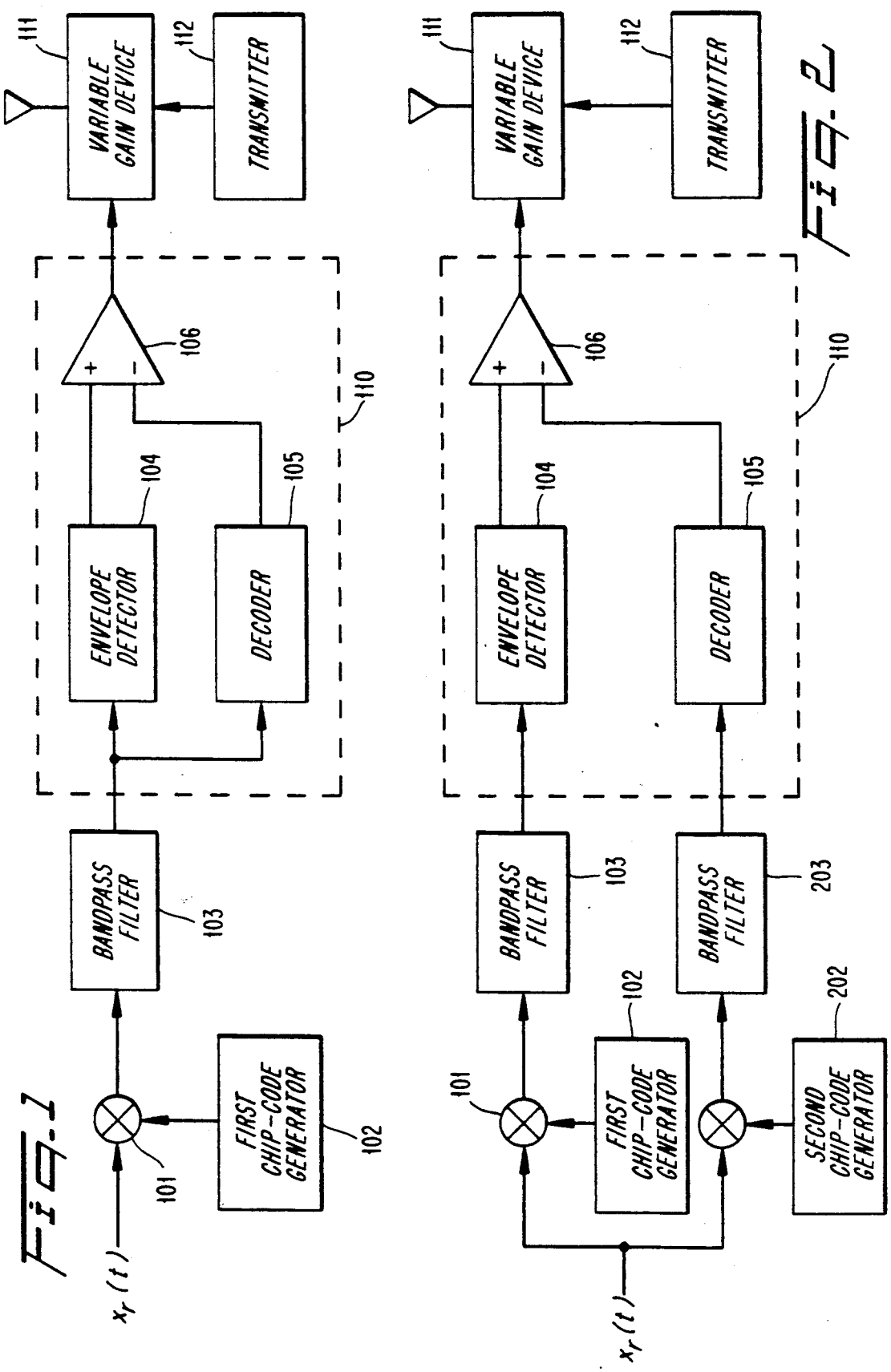

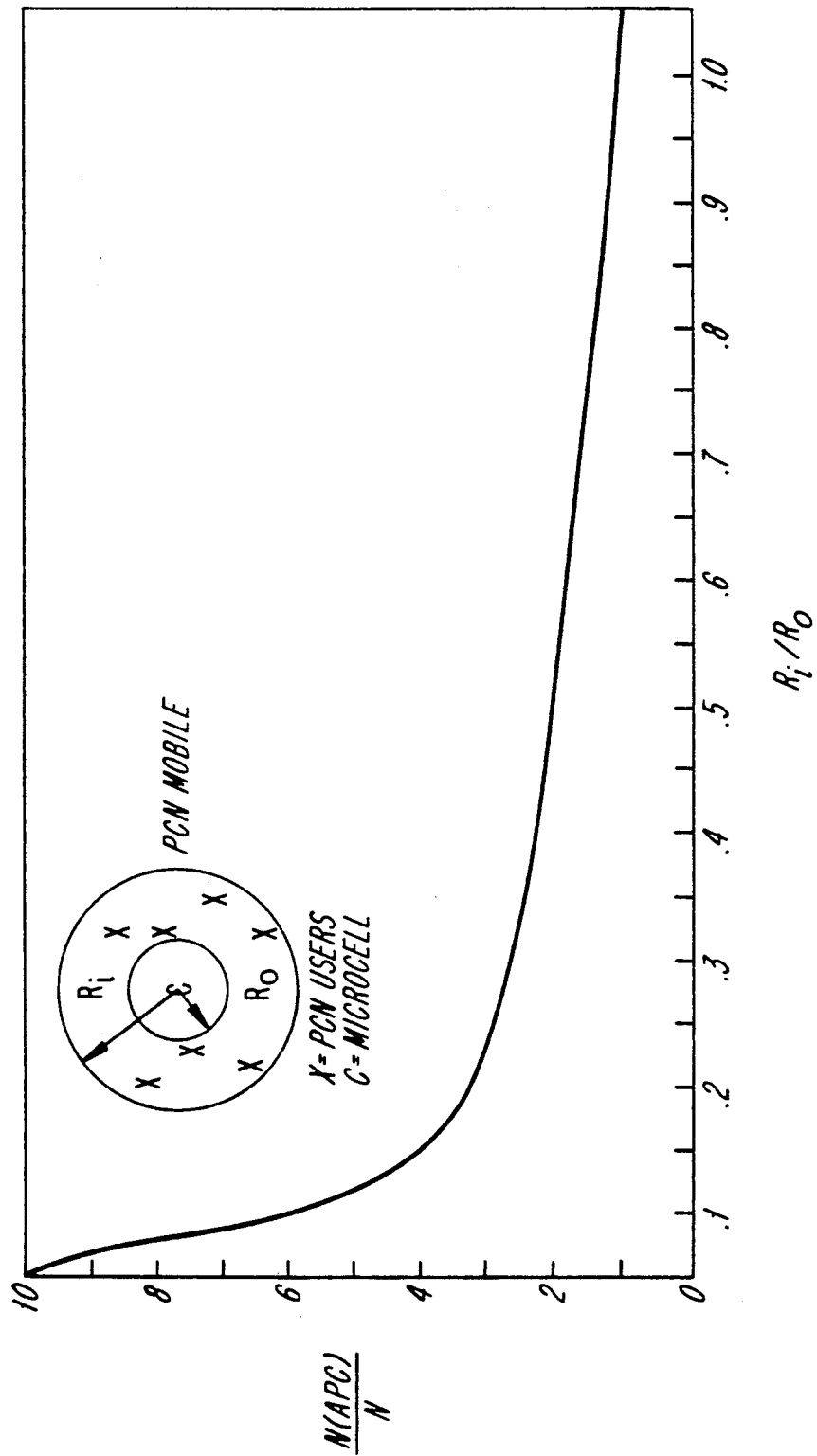

ADAPTIVE POWER CONTROL FOR A SPREAD SPECTRUM TRANSMITTER

BACKGROUND OF THE INVENTION

This invention relates to spread spectrum communications, and more particularly to an apparatus and method for adaptive power control of a spread-spectrum signal in a cellular, personal communications environment.

DESCRIPTION OF THE PRIOR ART

A spread-spectrum signal typically is generated by modulating an information-data signal with a chip-code signal. The information-data signal may come from a data device such as a computer, or an analog device which outputs an analog signal which has been digitized to an information-data signal, such as voice or video. The chip-code signal is generated by a chip-code where the time duration, $T_c$, of each chip is substantially less than a data bit or data symbol.

Spread spectrum provides a means for communicating in which a spread-spectrum signal occupies a bandwidth in excess of the minimum bandwidth necessary to send the same information. The band spread is accomplished using a chip code which is independent of an information-data signal. A synchronized reception with the chip-code at a receiver is used for despreading the spread-spectrum signal and subsequent recovery of data from the spread-spectrum signal.

Spread-spectrum modulation offers may advantages as a communications system for an office or urban environment. These advantages include reducing intentional and unintentional interference, combating multipath problems, and providing multiple access to a communications system shared by multiple users. Commercially, these applications include, but are not limited to, local area networks for computers and personal communications networks for telephone, as well as other data applications.

A cellular communications network using spread spectrum modulation for communicating between a base station and a multiplicity of users, requires control of the power level of a particular mobile user station. Within a particular cell, a mobile station near the base station of the cell may be required to transmit with a power level less than that when the mobile station is near an outer perimeter of the cell. This is done to ensure a constant power level at the base station, received from each mobile station.

In a first geographical region, such as an urban environment, the cellular architecture within the first geographical region may have small cells which are close to each other, requiring a low power level from each mobile user. In a second geographical region, such as a rural environment, the cellular architecture within the region may have large cells which are spread apart, requiring a relatively high power level from each mobile user. A mobile user who moves from the first geographical region to the second geographical region must adjust the power level of his transmitter, for meeting the requirements of a particular geographic region. Otherwise, if the mobile user travels from a sparsely populated region with fewand spread out cells using the relatively higher power level with his spread spectrum transmitter, to a densely populated region with many cells without reducing the power level of his spread spectrum transmitter, his spread spectrum transmitter may cause undesirable interference within the cell in which he is located and/or to adjacent cells.

Accordingly, there is a need to have a spread spectrum apparatus and method for automatically controlling a mobile user's spread spectrum transmitter power level when operating in a cellular communications network.

OBJECTS OF THE INVENTION

An object of the invention is to provide an apparatus and method which controls the power level of a mobile station so that the power level received at the base station of each cell is the same for each mobile station.

Another object of the invention is to provide an apparatus and method for automatically and adaptively controlling the power level of a mobile user in a cellular communications network.

Another object of the invention is to provide a spread-spectrum apparatus and method which will allow operating a spread spectrum transmitter in different geographic regions, wherein each geographic region has a multiplicity of cells, and cells within a geographic region may have different size cells and transmitter power requirements.

A further object of the invention is a spread-spectrum apparatus and method which allows a large number of mobile users to interactively operate in a mobile cellular environment having different size cells and transmitter power requirements.

A still further object of the invention is a spread-spectrum apparatus and method which controls a power level of a mobile user in a cellular communications network using a simple circuit.

An additional object of the invention is an apparatus and method for automatically controlling a power level of a mobile user which is easy to implement.

SUMMARY OF THE INVENTION

According to the present invention, as embodied and broadly described herein, an apparatus for adaptive-power control (APC) of a spread-spectrum transmitter is provided. A plurality of mobile stations operate in a cellular-communications network using spread-spectrum modulation. A base station transmits a generic spread-spectrum signal and an APC-data signal. The APC-data signal may be transmitted with or separate from the generic spread-spectrum signal. Each mobile station comprises acquisition means, detector means, decoder means, difference means, transmitter means, an antenna, and variable-gain means. The detector means is coupled to the acquisition means. The decoder means is coupled to the acquisition means for decoding the APC-data signal as a threshold. The difference means is coupled to the detector means and the decoder means. The antenna is coupled to the transmitter means. The variable-gain means is coupled to the difference means and between the transmitter means and the antenna.

The acquisition means acquires the generic spread-spectrum signal transmitted from the base station. The detector means detects a received power level of the generic spread-spectrum signal. The decoder means decodes the APC-data signal as a threshold. The difference means generates a comparison signal by comparing the received power level to the threshold. The comparison signal may be an analog or digital data signal. The transmitter means transmits a transmitter spread-spectrum signal. The variable-gain means uses the comparison signal as a basis for adjusting a transmitter-power level of the transmitter spread-spectrum signal from the transmitter means.

The present invention also includes a method for automatic-power control of a spread-spectrum transmitter for a mobile station operating in a cellular-communications network using spread-spectrum modulation. A base station transmits a generic spread-spectrum signal and an APC-data signal. The APC-data signal typically is a spread-spectrum signal. Each mobile base station performs the steps of acquiring the generic spread-spectrum signal transmitted from the base station, and detecting a received power level of the generic spread-spectrum signal. The steps also include decoding the APC-data signal as a threshold, from the generic spread-spectrum signal, or from a signal or channel separate from the generic spread-spectrum signal. The method further includes comparing the received power level to the threshold, and adjusting a transmitter power level of a transmitter spread-spectrum signal in response to the comparison.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 shows an adaptive power control receiver and transmitter according to the present invention;

FIG. 2 shows an adaptive power control receiver and transmitter according to the present invention;

FIG. 3 shows the relative effect of a multiplicity of users communicating with spread spectrum in a cellular environment with and without using adaptive power control.

DETAILED DESCRIPTION OF THE PREFERRED EMBODIMENTS

Figure 4:
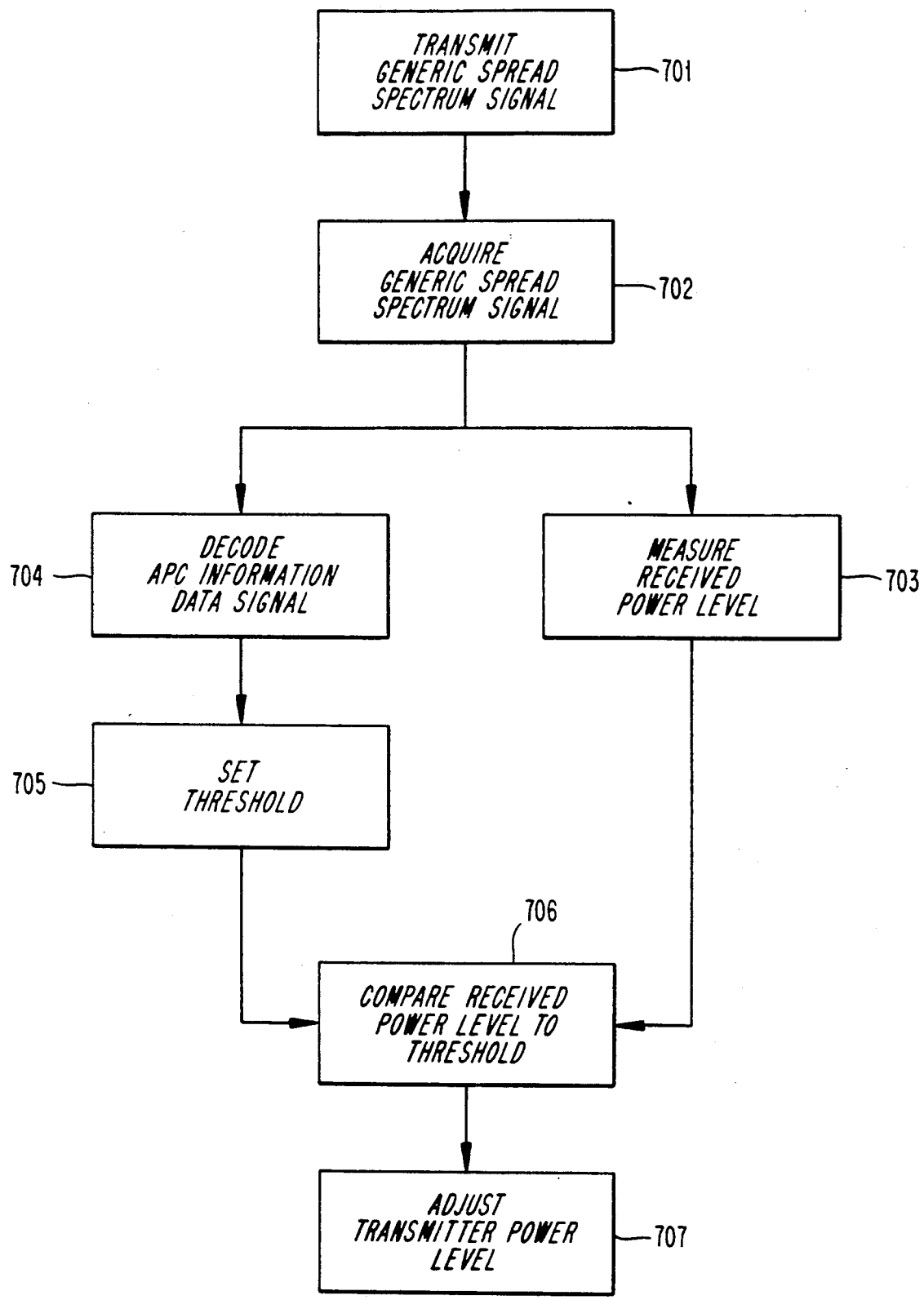
FIG. 4 is a flow chart of the method of the present invention.

Reference will now be made in detail to the present preferred embodiments of the invention, examples of which are illustrated in the accompanying drawings, wherein like reference numerals indicate like elements throughout the several views.

The present invention assumes that a plurality of mobile stations operate in a cellular-communications network using spread-spectrum modulation. The cellular communications network has a plurality of geographical regions, with a multiplicity of cells within a geographical region. The size of the cells in a first geographical region may differ from the size of the cells in a second geographical region. In a first geographical region such as an urban environment, a cellular architecture within the region may have large cells which are close to each other. In a second geographical region such as a rural environment, a cellular architecture within the region may have small cells which are spread apart.

A mobile station while in the first geographical region may be required to transmit a higher power level than while in the second geographical region. This requirement might be due to an increased range of the mobile station from the base station. Within a particular cell, a mobile station near the base station of the cell may be required to transmit with a power level less than that when the mobile station is near an outer perimeter of the cell. This is done to ensure a constant power level at the base station, received from each mobile station.

In the present invention, a base station within a particular cell transmits a generic spread-spectrum signal and an APC-data signal. The APC-data signal may be transmitted with or separate from the generic spread-spectrum signal. For example, a spread-spectrum signal using a first chip code may be considered a first channel having the generic spread-spectrum signal, and a spread-spectrum signal using a second chip code may be considered a second channel. The APC-data signal may be transmitted in the same channel, i.e. the first channel, as the generic spread-spectrum signal, or in a second channel which is different from the generic spread-spectrum signal.

In the exemplary arrangement shown in FIG. 1, an apparatus for adaptive-power control of a spread-spectrum transmitter is provided. Each mobile station comprises acquisition means, detector means, decoder means, difference means, transmitter means, an antenna, and variable-gain means. The apparatus, by way of example, may have the acquisition means embodied as a first product device 101, a first chip-code generator 102, and a bandpass filter 103. The detector means may be embodied as envelope detector 104. Other type detectors may be used with the present invention, such as square law detectors or coherent detectors, as is well known in the art. The decoder means may be embodied as decoder 105. The difference means may be embodied as differential amplifier 106, the transmitter means as transmitter 112 and the variable gain means as variable-gain device 111. The variable-gain device 111 may be a variable-gain amplifier, a variable-gain attenuator or any device which performs the same function as the variable-gain device 111 and described herein.

The first product device 101 is coupled to the first chip-code generator 102 and to the bandpass filter 103. The envelope detector 104 is coupled between the bandpass filter 103 and the differential amplifier 106. The decoder 105 is coupled between the bandpass filter 103 and the differential amplifier 106. The decoder 105 alternatively may be coupled to the output of the envelope detector 104. The variable-gain device 111 is coupled to the differential amplifier 106 and between the transmitter 112 and antenna.

The decoder 105, as illustratively shown in FIG. 2, alternatively may be coupled between a second bandpass filter 203 and differential amplifier 106. In this particular embodiment, the second bandpass filter 203 is coupled to a second product device 201. The second product device 201 is connected to a second chip-code generator 202. The embodiment of FIG. 2 could be used where the APC-data signal is transmitted over the second channel simultaneously while the generic spread-spectrum signal is transmitted over the first channel. The second channel uses a spread-spectrum signal with a second chip code, and the second chip-code generator 202 generates a second chip-code signal using the second chip code.

The product device 101, FIGS. 1 or 2, using a first chip-code signal from the first chip-code generator 102 acquires the generic spread-spectrum signal transmitted from the base station. The first chip-code signal has the same chip code as the generic spread-spectrum signal. The envelope detector 104 detects a received power level of the generic spread-spectrum signal. The received power level may be measured at the detector.

The decoder 105 decodes the APC-data signal from the generic spread-spectrum signal as a threshold. More particularly, data which establishes or sets the threshold for differential amplifier 106 is sent with the APC-data signal.

The differential amplifier 106 generates a comparison signal by comparing the received power level of the generic spread-spectrum signal to the threshold. The differential amplifier 106 may employ a differential amplifier or other circuits for performing the comparison function.

The transmitter 112 transmits a transmitter spread-spectrum signal. The variable-gain device 111 using the comparison signal, adjusts a transmitter-power level of the transmitter spread-spectrum signal from the transmitter. The variable-gain device 111 may be realized with a variable-gain amplifier, a variable-gain attenuator, or an equivalent device which can adjusts the power level of the transmitter spread-spectrum signal.

In operation, a base station in a cell may transmit the generic spread-spectrum signal on a continuous basis or on a repetitive periodic basis. Mobile stations within the cell receive the generic spread-spectrum signal. The received generic spread-spectrum signal is acquired and despread with the first chip-code signal from first chip-code generator 102 and first product device 101. The despread generic spread-spectrum signal is filtered through bandpass filter 103. The mobile station detects the despread generic spread-spectrum signal using envelope detector 104, and measures the received power level of the generic spread-spectrum signal.

The APC-data signal may be transmitted on the same channel as the generic spread-spectrum signal using the same chip code as the generic spread-spectrum signal. In this case, the APC-data signal is transmitted at a different time interval from when the generic spread-spectrum signal is transmitted. This format allows the mobile station to acquire synchronization with the first chip-code, using the generic spread-spectrum signal.

As an alternative, the APC-data signal may be transmitted on a different coded channel using a second chip code. In the latter case, the second spread-spectrum signal having the APC-data signal would be acquired by the second chip-code generator 202 and second product device 201. In either case, the APC-data signal is decoded using decoder 105. Further, the APC-data signal may be time division multiplexed or frequency division multiplexed with the generic spread-spectrum signal.

The decoder 105 decodes from the APC-data signal the value of the threshold for use by differential amplifier 106. For example, if there were eight levels for which to set the threshold level, then at minimum, a three bit word may be used with the APC-data signal to transmit the threshold to the mobile station. The threshold is used to adjust and or set the threshold of the differential amplifier 106. Accordingly, the received power level from envelope detector 104 is compared to the threshold of the differential amplifier 106.

If the received power level is greater than the threshold, then the variable-gain device 111 would decrement or decrease the transmitter spread-spectrum power level. If the received power level is less than the threshold at differential amplifier 106, then the variable-gain device 111 increases the transmitter spread-spectrum power.

The APC circuit 110 of FIGS. 1 and 2 may be built on a digital signal processor chip. An analog to digital converter located at the output of the bandpass filter 103 would convert the received signal to a data signal. The envelope detector 104, decoder 105 and differential amplifier 106 may be implemented as part of digital signal processing functions on the digital signal processor (DSP) chip. The analog to digital converters may be included on the DSP chip.

FIG. 3 shows the advantage of using an adaptive power control apparatus with a mobile station in a personal communications network. The number of adaptive power control mobile stations, N(APC), versus the number of mobile stations which can be used in a similar region, N, is plotted with respect to an inner radius, $R_i$, and an outer radius, $R_o$. When the inner radius goes to zero, using spread spectrum as code division multiplex, the number of users with adaptive power control who can operate within a cell, is approximately ten times the number of users without adaptive power control who can operate within the cell.

The present invention also includes a method for automatic-power control of a spread-spectrum transmitter for a mobile station operating in a cellular-communications network using spread-spectrum modulation. Referring to FIG. 4, a base station transmits 701 a generic spread-spectrum signal and an APC information-data signal. Each mobile base station performs the steps of acquiring 702 the generic spread-spectrum signal transmitted from the base station, and detecting 703 a received power level of the generic spread-spectrum signal. The steps also include decoding 704 the APC-data signal as a threshold, from the generic spread-spectrum signal, or from a separate signal from the generic spread-spectrum signal. A threshold is set 705 from the APC-data signal. The method further includes comparing 706 the received power level to the threshold, and adjusting 707 a transmitter power level of a transmitter spread-spectrum signal in response to the comparison.

It will be apparent to those skilled in the art that various can be made to the method and apparatus for adaptively controlling a power level of a spread spectrum signal in a cellular environment of the instant invention with out departing from the scope or spirit of the invention, and it is intended that the present invention cover modifications and variations of the method and apparatus for adaptively controlling a power level of a spread spectrum signal in a cellular environment provided they come in the scope of the appended claims and their equivalents.

I claim:

1. An apparatus for adaptive-power control of a spread-spectrum transmitter of a mobile station operating in a cellular-communications network using spread-spectrum modulation, comprising:
   a base station for transmitting a generic spread-spectrum signal and an APC-data signal;
   a multiplicity of said mobile stations, each mobile station having
      an acquisition circuit for acquiring and decoding the generic spread-spectrum signal;

a detector coupled to said acquisition circuit for detecting a received power level of the generic spread-spectrum signal;

a decoder coupled to said acquisition circuit for decoding the APC-data signal as a threshold;

a differential amplifier coupled to said detector and said decoder for generating a comparison signal by comparing the received power level to said threshold;

a transmitter for transmitting a transmitter spread-spectrum signal;

an antenna coupled to said transmitter; and a variable-gain device coupled to said differential amplifier and between said transmitter and said antenna, responsive to said comparison signal indicating an increase or decrease for adjusting a transmitter-power level of the transmitter spread-spectrum signal from said transmitter.

2. An apparatus for adaptive-power control of a spread-spectrum transmitter of a plurality of mobile stations operating in a cellular-communications network using spread-spectrum modulation, wherein a base station transmits a generic spread-spectrum signal and an APC-data signal, each mobile station comprising:

acquisition means for acquiring and decoding the generic spread-spectrum signal;

detector means for detecting a received power level of the generic spread-spectrum signal;

decoder means for decoding the APC-data signal as a threshold;

differential means for generating a comparison signal by comparing the received power level to said threshold;

transmitter means for transmitting a transmitter spread-spectrum signal;

an antenna; and variable-gain means responsive to said comparison signal for adjusting a transmitter-power level of the transmitter spread-spectrum signal from said transmitter.

3. The apparatus as set forth in claim 2 wherein said acquisition means includes:

a first chip-code generator;

a first bandpass filter; and a first product device coupled to said first chip code generator and said bandpass filter.

4. The apparatus as set forth in claim 2 wherein said differential means includes:

a differential amplifier.

5. The apparatus as set forth in claim 2 wherein said decoder means includes:

a data demodulator.

6. The apparatus as set forth in claim 2 wherein said variable-gain means includes:

a variable-gain attenuator.

7. The apparatus as set forth in claim 2 wherein said variable-gain means includes:

a variable-gain amplifier.

8. A method for adaptive-power control of a spread-spectrum transmitter of a plurality of mobile stations operating in a cellular-communication network using spread-spectrum modulating, wherein a base station transmits a generic spread-spectrum signal and an APC-data signal, said method comprising the steps at each mobile station, of:

acquiring and decoding the generic spread-spectrum signal;

detecting a received power level of the generic spread-spectrum signal;

decoding the APC-data signal as a threshold;

generating a comparison signal by comparing the received power level to said threshold;

transmitting a transmitter spread-spectrum signal; and adjusting a transmitter-power level of the transmitter spread-spectrum signal from said transmitter using said comparison signal.

* * * * *